United States Patent [19]

Bergling

[11] Patent Number: 4,923,313
[45] Date of Patent: May 8, 1990

[54] DEVICE IN ROLLING BEARINGS

[75] Inventor: Gunnar Bergling, Partille, Sweden

[73] Assignee: Aktiebolaget SKF, Sweden

[21] Appl. No.: 345,766

[22] Filed: May 1, 1989

[30] Foreign Application Priority Data

May 3, 1988 [SE] Sweden ................................ 8801655

[51] Int. Cl.$^5$ ........................ F16C 33/58; F16C 23/06; F16C 19/10
[52] U.S. Cl. .................................... 384/571; 384/563; 384/620
[58] Field of Search ................ 384/493, 495, 498, 517, 384/518, 535, 556, 557, 558, 563, 568, 571, 581, 618–622

[56] References Cited

U.S. PATENT DOCUMENTS

| | | | |
|---|---|---|---|
| 3,003,836 | 10/1961 | Hill | 384/620 X |
| 4,166,659 | 9/1979 | Gleichman | 384/620 |
| 4,279,451 | 7/1981 | Heldt | 384/581 X |
| 4,363,608 | 12/1982 | Mulders | 384/619 X |
| 4,676,667 | 6/1987 | Komatsu et al. | 384/517 X |

Primary Examiner—Thomas R. Hannon
Attorney, Agent, or Firm—Eugene E. Renz, Jr.

[57] ABSTRACT

Two rolling bearings, (10, 11) are mounted in pair and arranged to take up axial and radial loads. In order to prevent occurrence of abrasion corrosion the outer race rings (17, 18) are mounted in sleeves (19, 20) which to a limited extent are movable axially and radially relative to the bearing housing (13). The sleeves (19, 20) are designed with tapering contact surfaces (21, 22) adapted to center the sleeves during operation.

9 Claims, 3 Drawing Sheets

FIG. 2
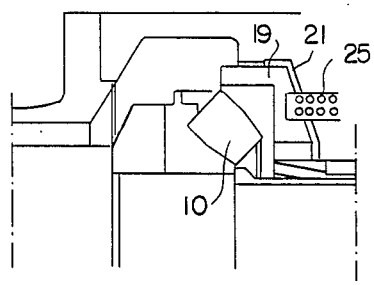
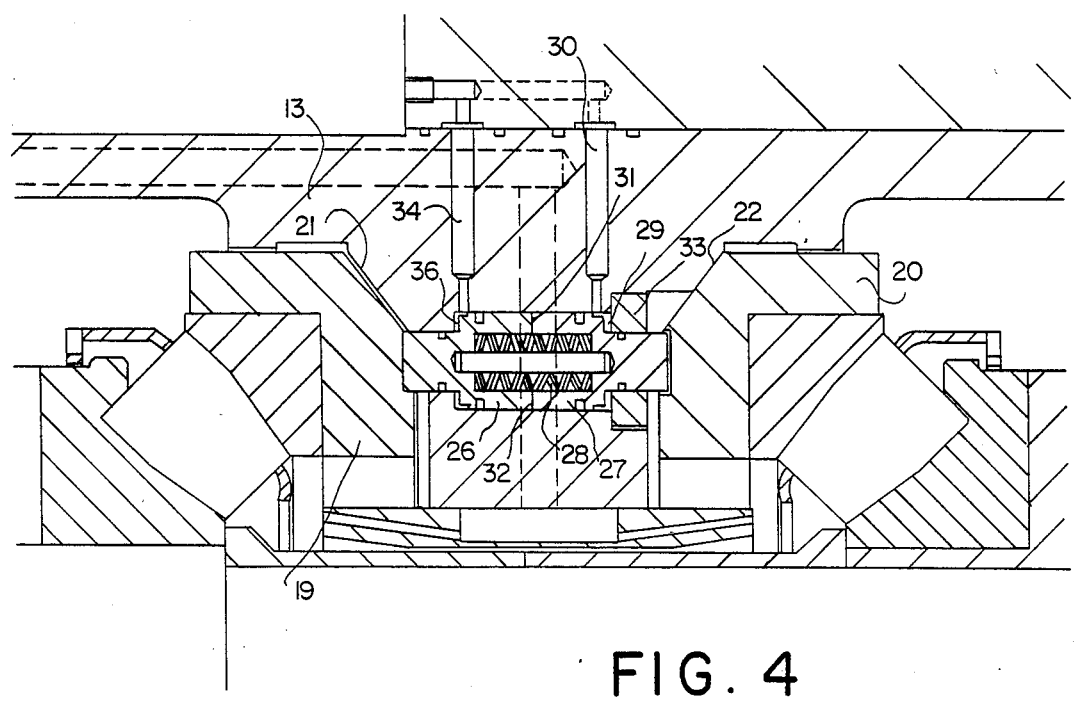
FIG. 4

DEVICE IN ROLLING BEARINGS

FIELD OF THE INVENTION

The present invention relates to a device in rolling bearings supporting axial and radial loads, such as spherical thrust bearings and taper roller bearings, whereby two bearings mounted in pairs are provided rotatably to support a shaft in a housing and where the bearings are arranged with contact lines converging or diverging against the shaft.

BACKGROUND OF THE INVENTION

Devices of this type are used in certain assemblies, e.g. at refineries in the paper industry. The assembly is easy to accomplish in those cases where the axial load acts in one direction only. One of the bearings is assembled radially and guided with the outer race ring mounted with a slight interference fit in the bearing housing. The outer race ring of the other bearing is fitted with radial clearance and is preferably assembled with a small axial clearance. The outer race ring of the outer bearing rests at the same time against a number of packets of springs, which together provide an overall axial load of sufficient size. At high speeds, the overrall spring force is designed to be great enough to compensate for occurring counter-acting axial loads in the bearing packet due to centrifugal forces and gyroscopic forces from the rolling bodies of the bearings and axial loads on the bearing, caused by radial forces on the radially guiding bearing. Hereby is ascertained that the outer race ring of the bearing with radial clearance always rests against the packet of springs with a substantially unaltered axial clearance in relation to its bearing seat. The packet of springs may possibly be supplemented with or be replaced by hydraulically generated forces.

By means of an arrangement described above, a clearance-free bearing assembly is obtained and an outer race ring for the bearing with radial clearance, which is not engaging its axial bearing seat. Radial motions of the shaft due to shape deviations of the races or shaft seats of the bearings, which cause radial warpings, are not absorbed as radial rubbing movement of the outer race ring of the bearing with radial clearance but result in a harmless axial wobbling motion of the last mentioned outer race ring against the packet of springs.

If the outer race ring of the bearing with radial clearance should be pressed against the bottom of its axial bearing seat, there would occur a radial rubbing resulting in abrasion corrosion. The bearing assembly furthermore should get a slackness, which may result in a large increase of the abrasion corrosion if rotational radial loads occur.

In those cases where the thrust load changes direction, the assembly will be more difficult to accomplish, particularly if a clearance-free support is required due to high speed or for other reasons. The outer race rings of both bearings in such cases must be spring loaded and furthermore have a loose fit. Radial warpings caused by shape deviations cannot be avoided and of the reasons mentioned above, the risk for abrasion corrosion at high rotational speed, is high at the outer race ring, which contacts its axial bearing seat, as radial rubbing motions cannot be prevented by a loose radial fit or by an outer race ring with radial clearance.

SUMMARY OF THE INVENTION

The purpose of the present invention is to provide a device of the type mentioned characterized by novel features of construction and arrangement whereby the problem of abrasion corrosion is eliminated even in the cases where the direction of the axial load alternates. To this end, there is provided a bearing support assembly comprising at least two bearings rotatably supporting a shaft in a housing wherein the contact lines are convergent or divergent and wherein the outer race rings of the bearings are mounted in sleeves in a manner to allow limited axial and radial movement.

BRIEF DESCRIPTION OF THE DRAWINGS

These and other objects of the present invention and the various features and details of the operation and construction thereof are hereinafter more fully set forth with reference to the accompanying drawings, where:

FIG. 2 shows in section an embodiment of a device according to the invention,

FIG. 4 shows in larger scale a portion of the device in FIG. 3.

DETAILED DESCRIPTION OF THE PREFERRED EMBODIMENT

Figure 1:
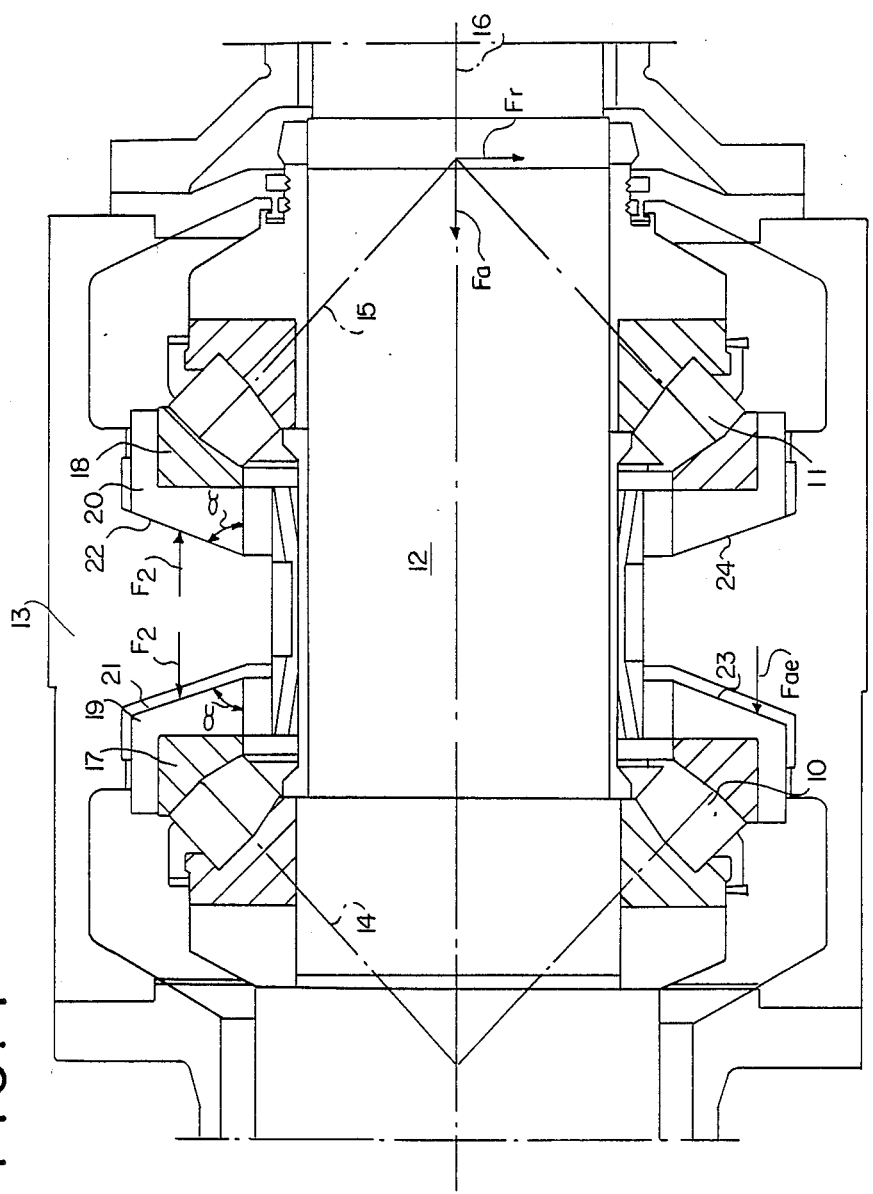
FIG. 1 shows a section of the invention in general form.

Corresponding details have been given the same reference numeral in the different figures.

As can be seen from the invention as illustrated in general form in FIG. 1, two spherical thrust roller bearings 10, 11 are provided rotatably to support a shaft 12 in a bearing housing 13. The bearings 10, 11 are mounted in pairs in so called O-wise relation, i.e. thus that the bearing contact lines, 14, 15 against the bearing axis 16 are diverging. The bearings 10, 11 may alternatively change place, i.e. be mounted in so-called X-wise relation, whereby the contact lines 14, 15 converge.

According to the invention, the outer race rings 17, 18 of the bearings 10, 11 are mounted with interference fit in sleeves 19, 20, which to a limited extent are movable axially and radially relative to the housing 13. The sleeves 19, 20 are designed with tapering contact surfaces 21, 22 intended to cooperate with correspondingly tapering contact surfaces 23, 24 in the bearing housing 13.

The bearings 10, 11 are biased with such an overall axial load F2, as required for causing the bearings to operate satisfactorily under all operating and load conditions. The bearings 10, 11 are shown in FIG. 1 in the position they occupy when an external thrust load Fa directed in the left hand direction is applied on the shaft 12. In order to prevent radial rubbing movements between the surfaces 21, 23 and 22, 24 it furthermore must be ascertained that the tapering contact surface of the outer race ring subjected to the external thrust load Fa, i.e. the contact surface 22 in FIG. 1, during all operating conditions is exerts an axial load with an overall axial force Fac, which is sufficient for causing the sleeve 20 to be centered against the contact surface 24. This is achieved in that the taper angle $\alpha$ of the sleeves 19, 20 are adapted to the maximum radial force Fr acting upon the shaft 12 and the force Fac.

Figure 3:
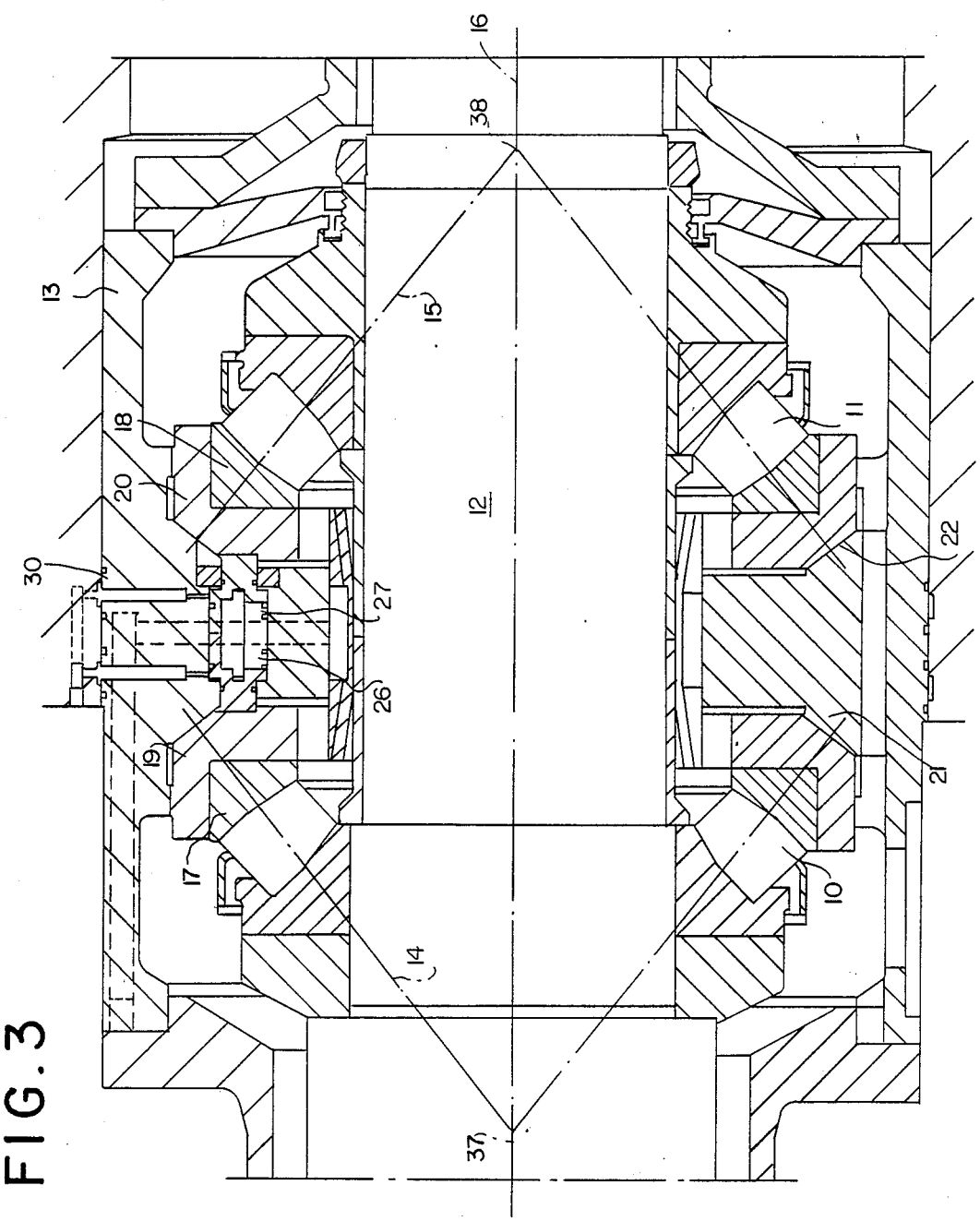
FIG. 3 shows in section another embodiment of a device according to the invention.

If the radial force Fr is small it is possible to choose the angle $\alpha$ comparatively big, whereby the radial forces acting upon the tapering contact surfaces and generated by the external thrust load Fa are limited. In the cases where the stresses in the bearing housing 13 permit so, the angle α however is preferably chosen smaller, and thereby preferably so that the perpendicular forces from the contact surfaces 21, 22 mainly pass the load centers 37, 38 of the bearings 10, 11 such as shown in FIG. 3, which is appropriate from a technical point of view. If it in this case is called for that the tapering contact surfaces 22, 24 shall have full contact along its entire circumferential extension the required value for the force Fac is obtained from the relationship $$Fac = 1.9 \, Fr \cdot tg \, \alpha.$$

The biasing force F2 in FIG. 1 can be generated by means of springs and/or hydraulic pistons. FIG. 2 shows an embodiment wherein a number of springs 25, which are distributed circumferentially along the periphery of the tapering surface 21 are clamped between the sleeve 19 and the housing 13. Corresponding springs are clamped between the sleeve 20 and the housing 13. Alternatively the springs 25 may be substituted for or supplemented by hydraulic pistons, which are pressed against the sleeves 19, 20. For causing a centering of the sleeve 20 in the tapering contact surface 24, the force Fac illustrated in FIG. 1 is preferably applied hydraulically.

The packet of springs 25 give no appreciable resistance against wobbling motions of a sleeve which is not centered. The hydraulic pistons within each power system, i.e. the power systems defined by the basing force F2 in FIG. 1 and the force Fac in FIG. 1, communicate with each other, whereby wobbling motions of the sleeve occur without resistance. Radial warpings or other radial motions of the shaft 12 thus are absorbed by the tapering contact surface, which is not centered, due to axial wobbling movements against the packets of springs 25 and/or the hydraulic pistons.

Such as shown in the drawing, the tapering contact surfaces 21–24 must not have a straight generatrix but it may have arbitrary shape.

If the axial load Fa changes direction, then the force Fac also changes direction and thus acts upon the contact surface 22. It is of course necessary that the above-mentioned requirement regarding Fac thereby is met.

Independent of the load direction, there is no risk for rubbing corrosion against the contact surfaces of the outer race rings 17, 18 or against the tapering contact surfaces 21, 22 of the sleeves 19, 20, wherein the outer race rings are mounted. One of the tapering contact surfaces 21, 22 take up all radial forces. The sleeves 19, 20 are thereupon built in externally with a radial clearance against the bearing housing 13, thus that there is contact only against one of the tapering contact surfaces 21, 22.

In FIG. 3 and 4 are shown a preferred embodiment of a device according to the invention, wherein two pistons 26, 27 are provided in the bearing housing 13. Between the pistons 26, 27 is provided a packet of up springs 28 or other springs, such as coil springs, such as shown. Another piston-spring assembly 26–28 is circumferentially distributed around the periphery of the contact surfaces and they are arranged to generate the forces F2 and Fac illustrated in FIG. 1. The springs 28 are dimensioned so that they provide an overall axial force corresponding to F2 in FIG. 1.

If the thrust load Fa has the direction shown in FIG. 1, then pressure medium will be supplied to a chamber 29, via a channel 30 before the machine connected to the shaft 12 is started. The chamber 29 is delimited beside by the piston 27, by a ring 33, which is screwed into the bearing housing 13. The hydraulic pressure in the chamber 29 is maintained constant under idle running and operation and is preferably adjusted thus that the hydraulic pressure acting upon the piston 27 will be totally somewhat greater than the overall force via the springs 28 whereby these springs are passivated and the sleeves 19, 20 are brought to contact against the opposed contact surfaces 31, 32. In this position the entire hydraulic force acts upon the bearing 10, which in turn applies the same force on the bearing. This force also has a centering effect upon the tapering surface 24, whereby there is no need to apply any additional centering force Fac, as the force F2 commonly is large than the force Fac. If required, according to the above, the relation between Fac and Fr and a larger axial load, the pressure in the chamber 29 is increased. If the radial load is low, it is possible to use a total hydraulic force lower than the force F2.

If the machine is run thus that an axial load is obtained in opposite direction, as compared to that according to FIG. 1, then pressure fluid is instead supplied at the same constant pressure through a channel 34 to a chamber 36 associated with the piston 26.

All pistons 26, 27 acting against one sleeve 19, 20 have a common supply of pressure fluid and communicate with each other. Thereby is ascertained a free wobbling motion of the tapering contact surface 21, 22 which is arranged with a clearance in relation to this corresponding contact surface in the bearing housing 13.

If the hydraulic pressure in the chambers 29, 36 should vanish the springs 28 immediately will react and apply upon the two bearings 10, 11 the total force F2 required for ascertaining that the bearings shall not break down at a high speed before the machine has come to a stop.

The above defined biasing force F2 is required by the bearing, which takes up the radial load, i.e. the bearing 11 in FIG. 1–4. For the other bearing, on the other hand, is required a lower, say about 25% lower, biasing force for obtaining a satisfactory function. By means of the embodiment according to FIG. 3 and 4 it is possible to achieve such a reduction of the biasing force if pressure medium is supplied via the channel 34 to the pistons 26. Pressure fluid for the chambers 29, 36 can be supplied from a common pump, whereby a pressure reduction valve is provided in the channel 34. Due to a reduction of the biasing force as described above, a corresponding reduction of the axial force acting on the bearing 11 could be obtained if the external axial force Fa is bigger than the reduction of the biasing force, which will favorably influence the life span of the bearing 11.

In the embodiments shown the bearings 10, 11 are mounted in a so-called O-wise relation. For all embodiments the bearings can also be mounted in so-called X-wise relation, whereby each outer race ring 17, 18 is subjected to load by separate hydraulic units and/or spring packets essentially of the type described above.

The advantages of the embodiment described in FIG. 3 and 4 are that it does not require any separate centering force Fac, which increases the bearing load and thereby reduces the life span, and that the hydraulic pressure can be maintained at a constant level during operation without this influencing the bearing load above what is effected by the overall spring force F2. By the present invention, the life span of the bearings can be increased by reduction of the basing force acting upon the bearing with axial clearance, the pressure medium supply can be easily switched over if the machine is driven with thrust load in opposite direction. Further there is no risk of bearing break-down in the event of loss of the hydraulic pressure and the tapering contact surfaces provide a very good centering both at idle running and during operational running without risk for rubbing.

What is claimed is:

1. A device for supporting axial and radial loads in rolling bearings comprising two bearing (10, 11.) mounted in pairs for rotatable supporting a shaft (12) in a housing (13), said bearings (10,11) being arranged with contact lines (14,15) converging or diverging relative to the axis of the shaft, the outer race rings (17,18) of the bearings (10,11) being mounted in sleeves (19,20) which are axially and radially moveable to a predetermine limited degree relative to the housing (13), said sleeves (19,20) having tapering contact surfaces (21,22) which cooperate with corresponding surfaces (23,24) of housing (13).

2. A device as claimed in claim 1, characterized therein, that the sleeves (19, 20) are associated with first power means (F2) adapted to generate opposed forces acting upon the sleeves (19, 20) for biasing bearings (10, 11) and second power means (Fac) for centering one of the sleeves (19,20).

3. A device as claimed in claim 2, characterized therein, that the taper angle of the sleeves (19,20) are chosen thus, that Fac is greater than or equal to the product 1.9 Fr and, wherein, Fac = the total axial force acting upon the sleeve (20) subjected to an external load.

Fr = the maximum radial force acting upon the shaft (12) and,

α = half the taper angle.

4. A device as claimed in claim 2, characterized therein, that the first and second power means (F2, Fac) incorporate a plurality of springs (25, 28), which are circumferentially distributed along the taper surface (21) periphery and are clamped between the sleeves (19, 20) and the housing (13) and/or hydraulic pistons (26, 27) that can be pressed against the sleeves (19, 20).

5. A device as claimed in claim 2, characterized therein, that the power means are a plurality of pistons (26, 27) distributed circumferentially along the periphery of the taper surface (21), which pistons are provided hydraulically to press against the sleeve (19, 20), whereby the pressure-actuated chambers (20, 36) associated with the pistons (26, 27) are preferably communicating with each other.

6. A device as claimed in claim 2, characterized therein, that the power means incorporate two pistons (26, 27) arranged in pairs, which are associated with spring means (28) adapted to press the pistons (26, 27) away from each other and against two opposed sleeves (19, 20).

7. A device as claimed in claim 6, characterized therein, that one (27) of the pistons (26, 27) is adapted hydraulically to be pressed against the other piston (26) during simultaneous passivation of the spring members (28).

8. A device as claimed in claim 7, characterized therein, that both pistons (26, 27) are adapted optionally to be pressed against the other piston.

9. A device as claimed claim 6, characterized therein, that a plurality of pistons (26, 27) are circumferentially distributed along the circumference of the taper surfaces (21, 22).

* * * * *